United States Patent Office 2,705,490
Patented Apr. 5, 1955

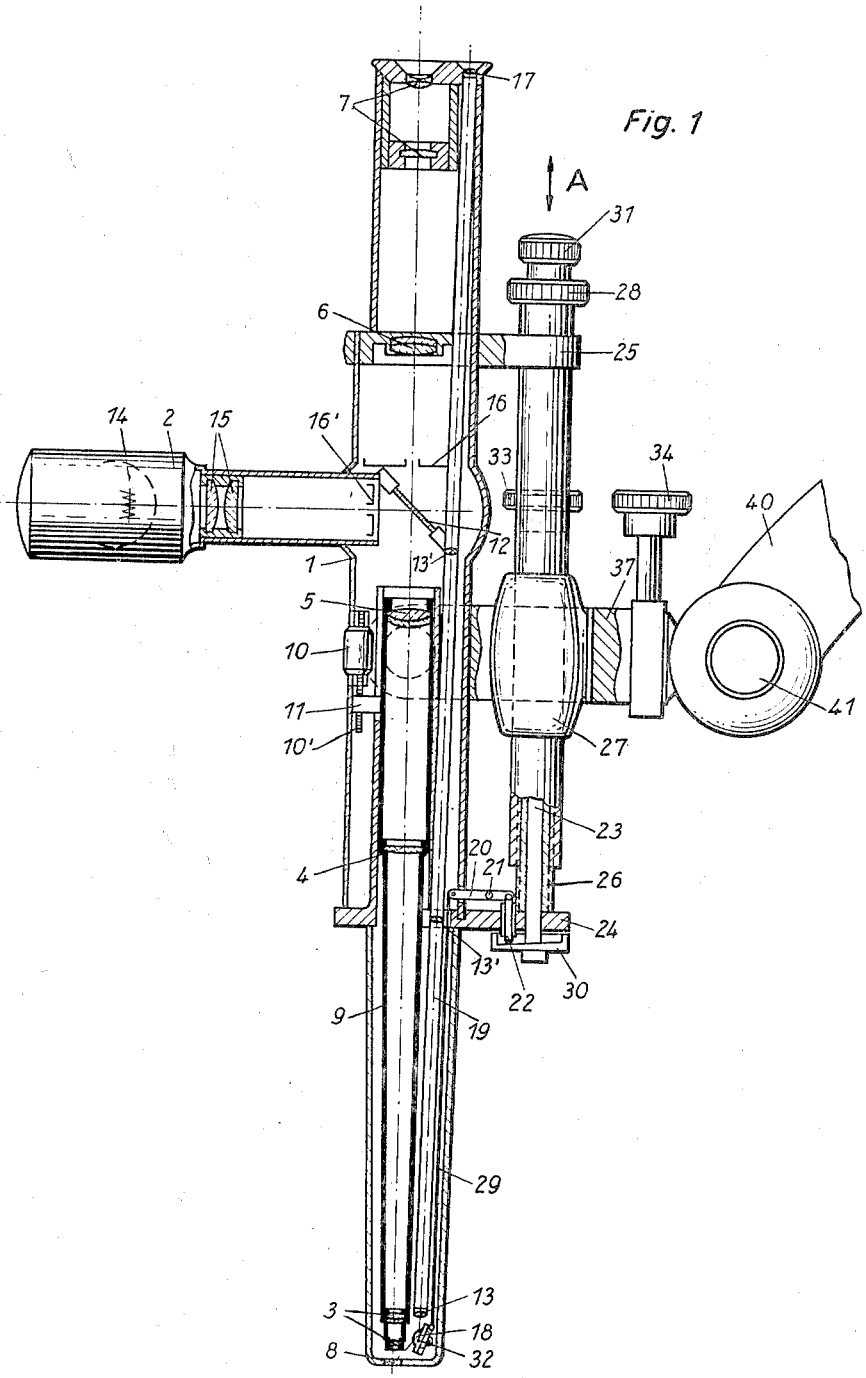

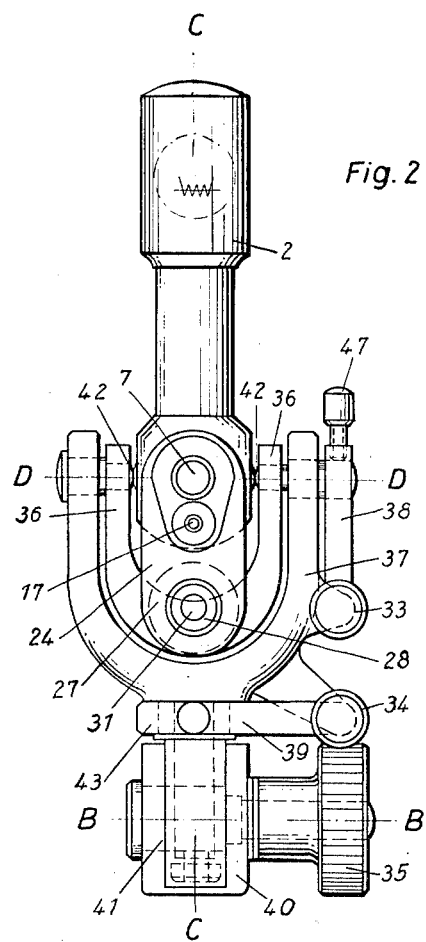

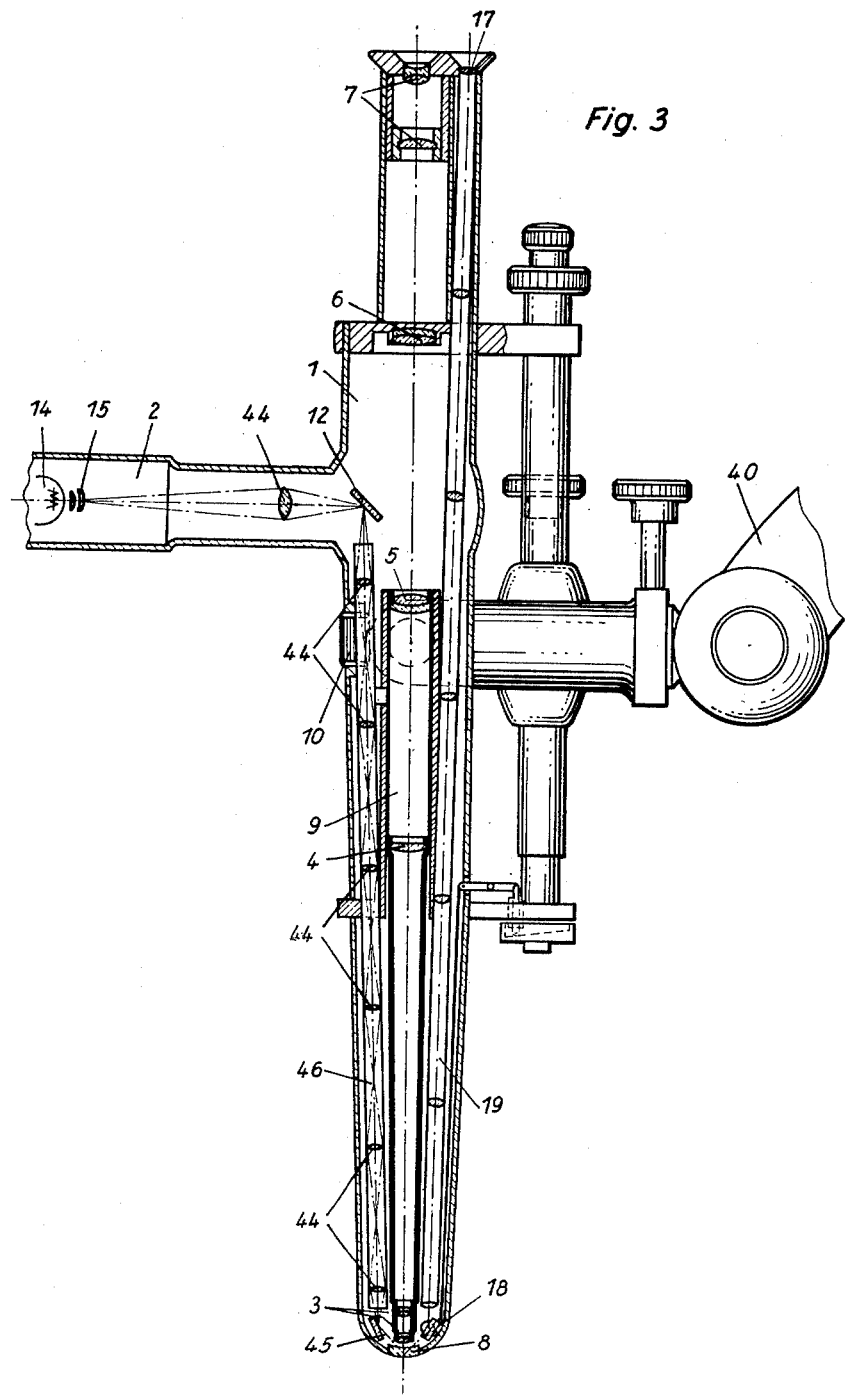

2,705,490

MICROSCOPE FOR THE EXAMINATION OF LIVING TISSUES IN BODY CAVITIES

Hans Littmann, Heidenheim (Brenz), Germany, assignor to Carl Zeiss, Heidenheim (Brenz), Germany Application December 7, 1950, Serial No. 199,591
In Germany August 5, 1949

Public Law 619, August 23, 1954
Patent expires August 5, 1969

5 Claims. (Cl. 128—6)

For the examination of the internal organs of the human being, optical instruments are employed in medical practice in the form of endoscopes, cystoscopes, colposcopes, etc., which permit the physician to observe the walls of the body cavity and to discover diseased spots. These instruments possess however either no magnification at all or only a low magnification; a microscopic examination of the living tissue of the cavity walls is therefore not possible. Precisely such examinations however possess today increased significance for early diagnosis of cancer. Hitherto in suspected cases of cancer, e. g. in cancer of the uterus, a part of the tissue was removed by a sample excision and subsequently examined under the microscope for cancerous degenerations of the cells and cell nuclei. Since such an excision always calls for an operative intervention under narcosis, it has been suggested to undertake the microscopic examination directly on the living tissue in the human body. Such an examination however presents considerable difficulties because of the necessary length of the instrument, further because of the poor orientation possibility with the required high magnification, and finally because of the necessity of precisely maintaining the object distance. Microscopes after the fashion of the customary instruments are for this reason not applicable.

The invention concerns a microscope which is so constructed that it can be introduced into body cavities and there makes possible examinations of the living tissue. In accordance with the invention, the observation path of rays of the microscope is lengthened through insertion of a reversing system and at the same time is firmly built together with a searcher microscope of low magnification and large field of view. Through the supplementary searcher microscope an orientation in the organ region to be examined is made possible, and thereby a steering of the highly magnifying principal microscope upon the tissue parts which are to be examined.

For lengthening the observation path of rays an optical reversing system of two elements serves suitably, which is placed between the image produced by the microscope objective and the ocular, whereby care is suitably taken that a parallel course of rays prevails between the elements. The intermediate imaging produced by the reversing system takes place advantageously at a scale of about 1:1.

The searcher microscope combined with the principal microscope can advantageously be equipped with a separate illumination, which lights up a large object area and therewith makes orientation possible for the physician. At the lookout of the searcher microscope a swingable mirror is advantageously provided, which, activated from without, permits a scanning of the cavity walls. Thereby the mirror swinging of the searcher microscope can be coupled perforce with the depth displacement of the entire apparatus, so that a spot appearing upon insertion, in the center of the field of view of the searcher microscope, perforce also lies in the center of the field of view of the principal microscope.

In accordance with a further thought of the invention a glass plate is arranged in front of the objective, the outer surface of which lies at a distance from the objective corresponding to its free working distance, and in use is pressed against the tissue to be examined. Thereby the object distance is clearly fixed. In order to thereby also make possible an observation of somewhat deeper lying tissue layers, an arrangement is suitably provided for displacing the objective with reference to the glass plate.

According to a further thought of the invention the required arrangement for illuminating the object is likewise directly solidly built together with the principal tube of the microscope. Thus a compact form results which for one permits an easy introduction of the apparatus into the body cavity, and furthermore essentially facilitates the working of the physician. The electric bulb is preferably provided for in an illuminating attachment on the microscope tube, which attachment lies outside the body cavity when the instrument is inserted, whereby the path of rays is led into the microscope tube across a deflecting mirror. Thereby it can be expedient to directly deflect the illuminating path of rays into the observation path of rays, according to the principle of the familiar epicondensers. In this case the mirror is advantageously arranged between the two elements of the reversing system provided in accordance with the invention in the parallel path of rays.

In another, specially preferred form of construction the deflection of the illuminating path of rays into the microscope tube results in such wise that this path of rays runs there separated from the observation path of rays. Thereby reflections, which under circumstances can arise at the microscope lenses and can lead to a deterioration of the image, are avoided with certainty. The image forming systems of the illuminating path of rays are in this case advantageously arranged in a separate tube which for its part is fastened in the principal microscope tube. The illuminating path of rays then leaves the principal microscope tube through the object plate placed at the lower end.

Further details of the invention ensue from the following description and the accompanying drawing, which represents two execution examples for application in colposcopy.

Fig. 1 shows a side view of a microscope developed in accordance with the invention, partly in section, Fig. 2 a top plan view upon the ocular end of the apparatus with details of the adjusting devices. In Fig. 3 is shown a further execution example.

The microscope for reflected light consists essentially of a closed tube 1 with an illuminating attachment 2. At its lower end facing the object, the tube is closed by a glass plate 8, at its other end by the oculars 7 and 17. The optical part of the microscope for reflected light consists of an objective 3 placed behind the glass plate 8, a field lens 4, a reversing system consisting of the two elements 5 and 6, and the already mentioned ocular 7. The objective 3 forms at the location of the field lens 4 an image of the object to be thought of as lying against the outer surface of the glass plate 8. Through the reversing system 5, 6 an intermediate imaging is produced, and the second image of the object is then observed through the ocular 7. The elements 5 and 6 are so arranged that a parallel path of rays prevails between them. Through the intermediate imaging is attained for one, that the total path of rays and therewith the microscope is correspondingly lengthened and the deflecting in of the illuminating path of rays at great distance from the objective is facilitated. The illuminating mirror 12 is arranged in the parallel path of rays between the elements 5 and 6. It receives the light of the incandescent bulb 14 mounted in the attachment 2 through the condenser 15. The field lens 4 is so proportioned, that it images the exit pupil of the objective 3 in the location of the aperture diaphragm 16' of the illuminating system, so that by corresponding proportioning of the aperture diaphragm provision can be made that this aperture diaphragm 16' can be fitted to that of the illuminating path of rays. In the observation path of rays the image of the objective pupil lies in the location of the aperture diaphragm 16. The lens 6 on the other hand is placed at such a distance from lens 5 that the optical length of path between the object image in the ocular image plane and the image of the objective pupil in the aperture diaphragm 16 is about equal to 180 mm. This length corresponds to the normal optical tube length for which the customary oculars are corrected.

The objective 3, the field lens 4, and the optical element 5 of the reversing system are separately arranged in a second tube 9 carried in the outer tube 1. This tube is slidable by means of a displacement spindle 10' activated through a knurl 10. The tube 9 carries for this purpose a female threaded piece 11 running upon the spindle 10'. The displacement makes possible a change in the distance between the objective 3 and the object to be thought of as lying against the outer surface of the glass plate 8. Since parallel rays exist behind element 5, nothing is changed in the remaining path of rays of the instrument by a displacement of the tube 9.

Alongside the principal microscope there is provided in tube 1 a supplementary auxiliary microscope in the form of a tube 19. The auxiliary microscope possesses an objective 13, intermediate lenses 13' and an ocular 17 arranged beside the principal ocular 7. The auxiliary microscope has practically a magnification of about 1 and permits the observation of a large object area across the mirror 18 arranged in front of its objective. Thereby the glass plate 8 serves as lookout window also for the auxiliary microscope. In order to be able to scan the object area, the mirror 18 is mounted swingable. It can be displaced by means of a rod 29. This rod engages a lever 20 anchored at 21, which for its part can again be swung over a pin 22. An axis 23 activated by the turnable grip 31 serves for displacing the pin 22. This axis carries at its lower end the disc 30 with oblique guide face, upon which pin 22 rests. By turning of the knob 31 the pin 22 is more or less raised at 30 as a consequence of the oblique guide face and thereby the mirror 18 is displaced by way of the lever system 22, 20, 29. An electric bulb 32 (lying in Fig. 1 behind the mirror 18), of the kind e. g. customary in cystoscopes, serves for general illumination of the object area visible across the mirror.

The entire microscope arrangement is attached upon a base stand 40 and can here be swung in three coordinates and supplementarily be finely displaced in depth. For this purpose the microscope tube 1 for one is firmly connected across the two bridges 24 and 25 with a spindle 26 which is carried in the cross head 27. The head itself is borne by the stand 40 in a manner still to be described later. For depth displacement in the direction of the arrow A the screw spindle 26 is turned with a knob 28, so that the spindle screws itself through the cross head 27. The axis 23 lies rotatable against a low friction in the interior of spindle 26 so that with turning of 28 axis 23 turns too and thereby results also a displacement of the mirror 18. There is therefore assured a perforce coupling of the mirror displacement with the height displacement of the entire microscope.

The entire microscope inclusive of the arrangement for depth displacement is attached to stand 40 across a clamping head 41. Thereby the apparatus in its entirety is tiltable about the axis B—B of the clamping head (Fig. 2). Thereby the clamp 35 serves for fixation. The clamping head 41 carries a fork 37, in which a second fork 36 is fastened rotatable about the axis D—D. The fork 36 in turn again carries the cross head 27 with the spindles 23 and 26 and the microscope tube 1. Besides, the fork 36 has guide bars 42 along which the microscope tube upon activation of the displacement knob 28 is shifted up and down in the direction of the arrow A (Fig. 1), i. e., in Fig. 2 perpendicular to the plane of the drawing.

Fine adjustment of the microscope in height above the ground results from inclination of the apparatus about the axis D—D. For this serves the adjustment knob 33 which swings the fork 36 together with the microscope tube about this axis D—D by way of a spindle and a clamping arm 38. The knob 47 serves for fixing. Lateral fine displacement is effected by swinging the apparatus about the axis C—C. For this purpose the turning knob 34 is provided which by way of a spindle and a clamping arm 39 swings the rotatable worm 43 about the axis C—C and therewith the entire fork 37 with the microscope.

For examination of the patient, e. g. for cancer of the uterus as in the present imagined case, the microscope is introduced into the vagina with its lower thin end. Thereby the principal direction of the apparatus is established by appropriate displacement of the stand 40 resting on the floor and suitable tilting about the axis B—B by releasing and again tightening the clamp 35. The microscope must now be inserted so far that the to be observed tissue part lies directly in contact with the glass plate 8. For the first in introducing the apparatus, as great a part as possible of the inner cavity is observed by way of the searcher microscope and the movable mirror. Thereby a fine displacement in height and width can be attained through activation of the adjustment knobs 33 and 34. If one has definitely fixed the direction of the area of interest, then the microscope must be displaced in depth by turning the grip 28. Thereby the mirror 18 is so directed that the center of the field of view of the searcher microscope always coincides with the center of the field of view of the principal microscope. The depth displacement is carried on by turning of 28 so far that the to be observed tissue part lies in direct contact with the glass plate 8. This part is then illuminated by the electric bulb 14 across the mirror 12 and can be microscopically examined in detail. Thereby for assuring a certain contact between the tissue and the plate 8, it can be advantageous to slightly arch the plate outwards. If one wishes to examine tissue layers lying somewhat deeper, the object distance is appropriately changed by displacement of the objective tube 9 by means of the knurl 10.

Fig. 3 shows a second execution example of the invention which differs esentially from that represented in Fig. 1 in that the illuminating path of rays for the principal microscope runs separated from the observation path of rays. The illumination surface produced by the electric bulb 14 and the condensor 15 is imaged upon the object itself across the lens system 44 and the mirrors 12 and 45, through the object plate 8 which here is developed vaulted. The lenses 44 can be arranged directly in the principal tube 1 especially since an encroachment upon the observation path of rays by scattered light is hardly to be feared, since the lower part of the latter, as is more closely elucidated at hand of Fig. 1, runs within the closed tube 9. For considerations of assembling, however, it can be advantageous to also mount the elements 44 in a tube 46, as represented, and then fasten this in tube 1. The number of lens elements 44 is determined by their focal length and the required length of the path of the illuminating rays.

Photomicrographs can be taken without further ado with the microscope constructed in accordance with the invention, in that the microscope is equipped with an attachable photomicrographic camera in the customary fashion.

I claim:

1. A diagnostic instrument for examining living tissues in body cavities including in a common tubular housing a first microscope system of high-magnifying power for examination purposes; a second microscope system of low magnifying power but of wide field of view for purposes of searching the field of examination; and at least one system illuminating the field of view of the said microscope systems, both said microscope systems including each an objective lens, an eyepiece, field lenses and optical reversing systems arranged between the respective said objective lenses and eyepieces; an object glass plate disposed at and sealing off the front end of said tubular housing to be introduced into the body cavity to be examined, the outer surface of said plate lying at a distance from said objective lenses corresponding to the free working distance of said microscope systems and serving as a tissue contact surface; a mirror located inside said tubular housing between said plate and said searching microscope objective, and means located at the outside of said tubular housing for tilting said mirror during operation of said instrument for searching all points of the said tissue field.

2. A diagnostic instrument according to claim 1 comprising adjusting means for swinging said tubular housing with regard to the tissue to be examined around a fixed element, and additional means for finely displacing said tubular housing in the direction of the optical axis of said examination microscope system, said finely displacing means being mechanically coupled with said mirror tilting means.

3. In a diagnostic instrument according to claim 1 means for finely adjusting the distance between at least said examination microscope objective lens and said object glass plate.

4. In a diagnostic instrument according to claim 1 a first illuminating system for said examination microscope system at least comprising a lamp, a condensor, both disposed in a tubular attachment of said tubular housing, a deflecting mirror for directing the illuminating rays with their central axis substantially parallel to and spaced from the optical axis of said examination microscope system, and a second mirror disposed near the said front end of said tubular housing adjacent said object glass plate for directing the illuminating rays onto the tissue field of examination.

5. In a diagnostic instrument according to claim 1 a first illuminating system for said examination microscope system at least comprising a lamp, a condenser, both disposed in a tubular attachment of said tubular housing, a deflecting mirror for directing the illuminating rays with their central axis substantially parallel to and spaced from the optical axis of said examination microscope system, and a second mirror disposed near the said front end of said tubular housing adjacent said object glass plate for directing the illuminating rays onto the tissue field of examination, and a second illuminating system for said searching microscope system including a second lamp located near said tiltable mirror.

References Cited in the file of this patent

UNITED STATES PATENTS

| | | |
|---|---|---|
| 532,666 | Johnson | Jan. 15, 1895 |
| 828,511 | Saegmuller | Aug. 14, 1906 |
| 1,143,667 | Von Rohr | June 22, 1915 |
| 1,459,313 | Reisler et al. | June 19, 1923 |
| 1,848,788 | Loeck | Mar. 8, 1932 |
| 1,864,895 | Egy | June 28, 1932 |
| 1,873,149 | Perez | Aug. 23, 1932 |
| 2,195,657 | Ott | Apr. 2, 1940 |

FOREIGN PATENTS

| | | |
|---|---|---|
| 709,732 | Germany | Aug. 25, 1941 |